US011603945B2

(12) United States Patent
Fachechi et al.

(10) Patent No.: US 11,603,945 B2
(45) Date of Patent: Mar. 14, 2023

(54) ACTUATOR AND COMPACT EGR VALVE

(71) Applicant: Stanadyne LLC, Windsor, CT (US)

(72) Inventors: Nicola Fachechi, West Hartford, CT (US); Paul D. Free, Hope, IN (US); Walter A. Hoemann, Elgin, SC (US)

(73) Assignee: Stanadyne LLC, Windsor, CT (US)

( * ) Notice: Subject to any disclaimer, the term of this patent is extended or adjusted under 35 U.S.C. 154(b) by 255 days.

(21) Appl. No.: 17/147,765

(22) Filed: Jan. 13, 2021

(65) Prior Publication Data

US 2021/0332906 A1 Oct. 28, 2021

Related U.S. Application Data

(60) Provisional application No. 63/013,769, filed on Apr. 22, 2020.

(51) Int. Cl.
*F16K 31/04* (2006.01)
*F02M 26/54* (2016.01)
(Continued)

(52) U.S. Cl.
CPC ........... *F16K 31/042* (2013.01); *F02M 26/54* (2016.02); *F02M 26/70* (2016.02); *F16K 3/26* (2013.01); *F16K 31/08* (2013.01); *F16K 31/105* (2013.01)

(58) Field of Classification Search
CPC .......... F16K 31/042; F16K 3/26; F16K 31/08; F16K 31/10–105; F16K 31/043; F02M 26/54; F02M 26/70
(Continued)

(56) References Cited

U.S. PATENT DOCUMENTS

| 3,421,700 A | * | 1/1969 | Laine | H02K 7/06 |
| | | | | 239/416 |
| 3,488,030 A | * | 1/1970 | Hulme | F16K 31/046 |
| | | | | 251/129.05 |

(Continued)

FOREIGN PATENT DOCUMENTS

| EP | 2768125 A2 | 8/2014 |
| EP | 3502531 A1 | 6/2019 |
| WO | 2019210955 A1 | 11/2019 |

OTHER PUBLICATIONS

PCT International Search Report and Written Opinion for International application No. PCT/US2021/013246 filed Jan. 13, 2021; dated Apr. 13, 2021.

(Continued)

*Primary Examiner* — John Bastianelli
(74) *Attorney, Agent, or Firm* — Alix, Yale & Ristas, LLP (57) ABSTRACT

An actuator is driven by a brushless motor having a rotor with axially extended magnets, permitting axial movement of the rotor while maintaining overlap between the magnets and a stator secured in a fixed position. The rotor is engaged with a fixed structure by a connection such as a ramp or thread that translates rotation into axial movement of the rotor along a rotational axis of the actuator. A valve member coupled to the rotor moves axially between a closed position and a range of positions that regulate fluid flow through a valve. A motor control circuit applies power to the stator coils to rotate the rotor and coupled valve member to a desired axial position and maintain the rotor and valve member at the selected position. The rotor and valve member may be biased toward a rotational position corresponding to a closed position of the valve member.

7 Claims, 9 Drawing Sheets

(51) Int. Cl.
*F02M 26/70* (2016.01)
*F16K 3/26* (2006.01)
*F16K 31/08* (2006.01)
*F16K 31/10* (2006.01)

(58) Field of Classification Search
USPC ...... 251/129.11–129.13, 129.2, 65; 335/266, 335/229
See application file for complete search history.

(56) References Cited

U.S. PATENT DOCUMENTS

| | | |
|---|---|---|
| 4,540,022 A | 9/1985 | Cove |
| 4,742,989 A * | 5/1988 | Akagi .................. F16K 31/047 251/129.05 |
| 4,825,906 A | 5/1989 | Hartman |
| 5,184,593 A * | 2/1993 | Kobayashi ............. F02M 26/67 123/568.24 |
| 6,089,536 A * | 7/2000 | Watanabe ............. F02M 26/54 123/568.24 |
| 6,105,614 A | 8/2000 | Bohaychuk et al. |
| 6,460,567 B1 * | 10/2002 | Hansen, III ............. F16K 31/04 137/625.48 |
| 6,492,753 B2 | 12/2002 | Zepp et al. |
| 6,555,941 B1 | 4/2003 | Zepp et al. |
| 6,923,427 B2 * | 8/2005 | Yonezawa ............. F16K 31/105 251/77 |
| 6,943,478 B2 | 9/2005 | Zepp et al. |
| 7,042,128 B2 | 5/2006 | Zepp et al. |
| 7,482,717 B2 | 1/2009 | Hochhalter et al. |
| 7,633,197 B2 | 12/2009 | Isoda et al. |
| 7,746,013 B2 | 6/2010 | Fernengel et al. |
| 7,839,108 B2 | 11/2010 | Patel et al. |
| 8,487,575 B2 | 7/2013 | Yeh et al. |
| 2005/0218727 A1 | 10/2005 | Gandel et al. |
| 2006/0238039 A1 | 10/2006 | Niedermeyer et al. |
| 2009/0229583 A1 | 9/2009 | Kotooka et al. |
| 2016/0290340 A1 * | 10/2016 | Maurino ............. F04D 15/0038 |

OTHER PUBLICATIONS

"Calculating BLDC Stator Temperature and Relationships with other Parameter"; Yang et al.; International Research Journal of Engineering and Technology (IRJET); vol. 06 Issue: 3; Mar. 2019; www.irjet.net; e-ISSN: 2395-0056; p-ISSN: 2395-0072; Impact Factor value: 7.211; ISO 9001:2008 Certified Journal; pp. 2058-2062; 5 pgs.

"Temperature Estimation of Stator Winding in Permanent Magnet Synchronous Motors Using d-Axis Current Injection"; Jun et al.; energies; MDPI; Accepted; Jul. 30, 2018; Published: Aug. 6, 2018; Energies 2018, 11, 2033; doi: 10.3390/en11082033; www.mdpi.com/journal/energies; pp. 1-14.

"Analysis of the Effect of the Motor Temperature to Brushless Direct Current Motor Performance on KARLING Electric Vehicle"; Garniwa et al.; Conference Paper Apr. 24, 2019; https://www.researchgate.net/publication/332622289; 9 pgs.

* cited by examiner

ACTUATOR AND COMPACT EGR VALVE

BACKGROUND

Aspects of the disclosure relate to a compact actuator and exhaust gas recirculation (EGR) valve.

It is well known in the field of automotive engineering and in particular in connection with emissions and fuel efficiency improvements in internal combustion engines to provide an exhaust-gas recirculation system. An EGR valve regulates the flow of exhaust gases to the engine intake system, resulting in increased engine efficiency, reduced fuel consumption and lower nitrogen oxide pollutant emissions. EGR valves operate in a high heat environment and are exposed to exhaust gasses that can accumulate carbon deposits on the valve, resulting in failure.

SUMMARY OF THE INVENTION

In embodiments of the disclosed actuator, a brushless motor includes an axially extended magnets in a rotor, permitting axial movement of the rotor while maintaining overlap between the magnets and a stator secured in a fixed position. The rotor is engaged with a fixed structure such as a housing of the actuator in a manner that translates rotation into axial movement. A threaded connection between the rotor and a fixed structure is one example of such an engagement. In one disclosed embodiment, the rotor includes a spiral ramp or thread on a circumferential outside surface and a housing includes a complementary spiral ramp or thread on an opposing inside surface. In an alternative embodiment, the rotor includes a nut engaged with a ramp or thread on a fixed axial shaft. In either embodiment of the actuator, the mated ramp or threads on the rotor and fixed structure translate rotation of the rotor into axial movement of the rotor and a member coupled to the rotor. The configuration of the thread or ramp can be selected to change the number of rotor turns corresponding to a desired axial movement.

According to aspects of the disclosure, an outrunner brushless motor configuration where the rotor surrounds the stator provides improved torque in conjunction with a nut engaged with a ramp or thread on an axial shaft or post. According to aspects of the disclosure, the member moved by the actuator may be rotationally symmetrical and coupled to rotate with the rotor. In an alternative embodiment, the coupling between the rotor and the member may allow the member to remain rotationally fixed by an axial track or the like, while being moved axially by the rotor. In an embodiment where the member rotates with the rotor, the coupling between the rotor and the member may include an elastic component to absorb energy when the member reaches a fully open or fully closed position. In the context of a disclosed compact EGR valve, rotation of a cylindrical valve member acts to remove deposits that may otherwise accumulate on the valve member or adjacent structures. A leading edge of the cylindrical valve member may include teeth or serrations to cut away deposits and maintain smooth movement of the valve member.

A body of the EGR valve may define a plurality of metering passages that are exposed as the cylindrical valve member is retracted away from a closed position. The number and shape of the metering passages can be selected to define a rate of gas flow through the EGR valve at various axial positions of the cylindrical valve member. A pressure balancing piston is continuously exposed to gas pressure and reduces the forces imposed on the valve member. The pressure balancing piston may include insulation to reduce the heat to which the actuator is exposed.

An electronic control unit of the valve can either be integrated into the valve or mounted remotely for higher temperature applications. The motor design allows optionally also for sensorless position control. In one mode, the control circuit can may function similarly to that of a stepper motor that divides a full rotation into a number of equal steps. The motor's position can then be commanded to move and hold at one of these steps to define a fixe position of a valve member.

Advantages of the disclosed compact EGR valve include: Continuous mechanical self-cleaning that eliminates software controlled cleaning cycles; Long and slender cartridge style design allows easy assembly and disassembly on engine; Pressure balancing allows the use of a smaller motor and improves controllability; Sliding valve style with opening in the wall of the main body allows a very accurate control of the relationship between valve member movement and gas flow through the valve (gain); Quantity and shape of openings allow for scaling of the flow area for different applications; Cylindrical moving elements may act as journal bearings and eliminate the need for roller bearings; Integral design significantly reduces number of components compared to prior art (50-70%); Sensorless Field Oriented Control may eliminate the need for separate hall or position sensors.

Applications of the disclosed actuator and compact EGR valve include: Scalable EGR for 600 ccm to 15 L or larger Diesel engines; A shunt valve for an after treatment system; An exhaust brake for trucks; A valve for use with sequential turbochargers. Alternatively, the disclosed actuator could be used as part of an electronic thermostat to regulate coolant temperature in large engines more accurately than existing thermally actuated valves that are either open or closed.

DETAILED DESCRIPTION

Figure 1:
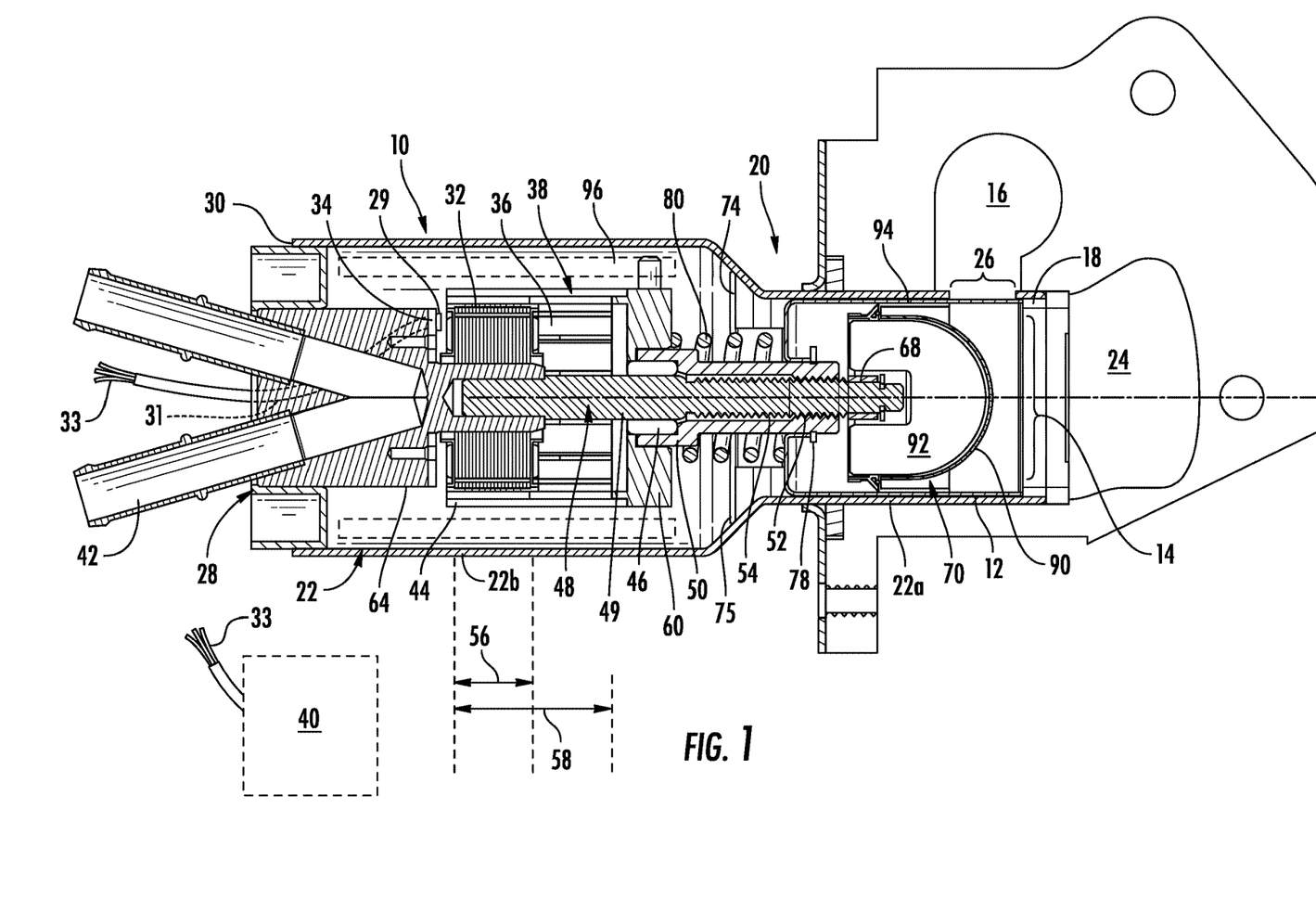
FIG. 1 is a longitudinal sectional view of one embodiment of an actuator incorporated into a compact EGR valve according to aspects of the disclosure.
Figure 2:
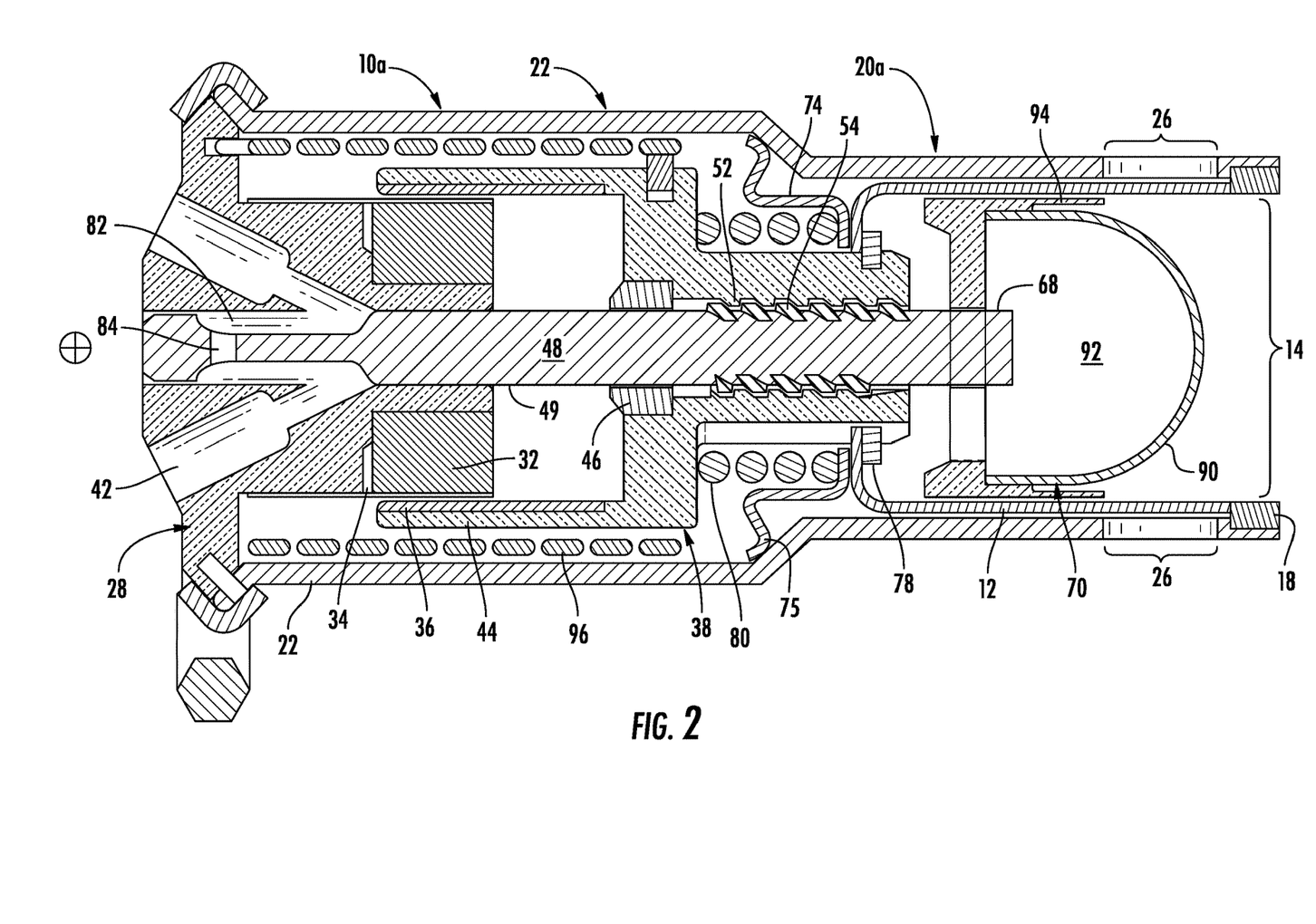
FIG. 2 is a longitudinal sectional view of an alternative embodiment of an actuator and compact EGR valve according to aspects of the disclosure.

FIG. 1 is a longitudinal sectional view of a first embodiment of an actuator 10 according to aspects of the disclosure incorporated into a compact EGR valve 20. The compact EGR valve 20 illustrated in FIG. 1 employs the disclosed brushless (solid state) motor-driven actuator 10 to move the valve member 12 between open and closed positions according to commands from an engine control unit (ECU, not shown). When opened, the disclosed EGR valve 20 permits exhaust gasses to flow from an axial opening 14 into a passage 16 connected to the intake of the internal combustion engine. In the closed position shown in FIG. 1 the cylindrical valve member 12 is seated against an annular valve seat 18 preventing gas flow through the EGR valve 20. FIG. 2 is a longitudinal sectional view through an alternative embodiment of an actuator 10a and compact EGR valve 20a similar in structure and function to the actuator 10 and EGR valve 20 of FIG. 1. The following description will refer to the actuator and EGR valve embodiments of FIG. 1 but should be understood to apply to the actuator and EGR valve embodiments of FIG. 2 except where the embodiments differ. A stepped cylindrical tubular housing 22 may be constructed of stainless steel commonly used in the manufacture of exhaust systems. A narrow end 22a of the housing 22 is configured to be received in a passage 24 that is continuously exposed to exhaust gas flow. The disclosed compact EGR valve 20 is configured to control flow of exhaust gas to a passage 16 surrounding the narrow end 22a of the housing 22 and communicating with the intake of the internal combustion engine. The portion 22b of the housing 22 exterior to the exhaust manifold has an increased diameter to accommodate components of the actuator 10. The narrow end 22a of the housing 22 extending into the passage includes a seat insert that defines an annular valve seat 18. The side wall of the narrow end 22a of the housing 22 defines a plurality of metering passages 26 that are exposed as the cylindrical valve member 12 is retracted from the closed position shown in FIGS. 1 and 2. The number and shape of the metering passages 26 can be selected to define a rate of exhaust gas flow through the EGR valve 20 at various axial positions of the cylindrical valve member 12.

An end cap 28 spans an outer end 30 of the housing 22 and supports the electromagnetic coils comprising the stator 32 of a brushless DC motor. In the embodiments of FIGS. 1 and 2, a ring-shaped PC board 34 is mounted to the end cap 28 to support a position sensor 29 to sense the position of magnets 36 in the rotor 38 for motor control. It is also possible to employ sensorless methods to control a brushless DC motor, as is known in the art. Brushless motor control is well-understood by those skilled in the art and will not be discussed in detail. The end cap 28 is constructed of thermally conductive material such as aluminum and defines at least one passage 31 for conductors 33 to deliver power to each group of coils in the stator 32 and for power and signal conductors for the magnetic position sensor 29. The conductors 33 extend through the end cap 28 to a control circuit 40 that is protected from the high heat of the exhaust system. The disclosed actuator 10 and compact EGR valve 20 is exposed to high temperatures and vibration, so separating the control circuit 40 from the actuator 10 and EGR valve 20 allows temperature sensitive components to be placed in an area with reduced temperature and vibration. The magnetic position sensor 29 is selected to withstand relatively high temperatures present in an actuator 10 positioned near the exhaust system. One example of a suitable magnetic position sensor 29 is the MA702GQ manufactured by Monolithic Power Systems, Inc. The end cap 28 also defines at least one coolant flow passage 42 for coolant to keep the temperature of the PC board 30, magnetic position sensor 29, stator 32 and conductors 33 below their safe operating temperature by removing heat from the end cap 28.

The rotor 38 includes a magnet ring 44 that supports permanent magnets 36 surrounding the stator coils in an outrunner motor configuration. The rotor 38 is supported by a bushing 46 on a post 48 anchored in the end cap 28. The post 48 defines an axis of rotation A for the rotor 38 and includes a cylindrical portion 49 on which the bushing 46 slides during axial movement of the rotor 38 between a retracted position and the extended position shown in FIG. 1. The bushing 46 may be of any type capable of withstanding the high temperature operating environment of the compact EGR valve 20 and may be constructed of ceramic or polyether ether ketone (PEEK) or other suitable material such as ceramic. A nut 50 is connected to rotate with the rotor 38 and includes a female ramp or thread 52 on its inside surface. The post 48 includes a ramp or thread 54 complementary to the ramp or thread 52 on the inside of the nut 50. It is preferred that the nut 50 is permanently joined to the other components of the rotor 38. In the embodiment of FIG. 1, the nut 50 extends axially away from the magnet ring 44 and the ramp or thread 52 on the inside of the nut 50 is positioned spaced away from the bushing 46 along the axis of rotation A of the rotor 38.

Power applied to groups of coils in the stator 32 produce a rotating magnetic field that acts on magnets attached to the rotor 38 to rotate the rotor 38 relative to the stator 32 in a manner known in the art. According to aspects of the disclosure, the stator 32 has a first axial length 56 along a rotational axis A of the rotor, and the rotor 38 includes magnets 36 that extend a second axial length 58 greater than the first axial length 56 of the stator 38. The extended axial length 58 of the magnets 36 allows the rotor 38 to move axially relative to the stator 32 while maintaining a substantially constant magnetic coupling between the stator 32 and rotor 38. This results in a brushless motor having a substantially constant torque over a range of rotor positions, so long as the magnets 36 span the axial length 56 of the stator 32. A motor control circuit 40 applies power to selected coils in the stator 32 in a sequence that generates torque to rotate the rotor 38 and coupled cylindrical valve member 12 away from the seat 18 defined at the narrow ("hot") end 22a of the housing 22 received in passage 24 communicating with the exhaust manifold.

Figure 3:
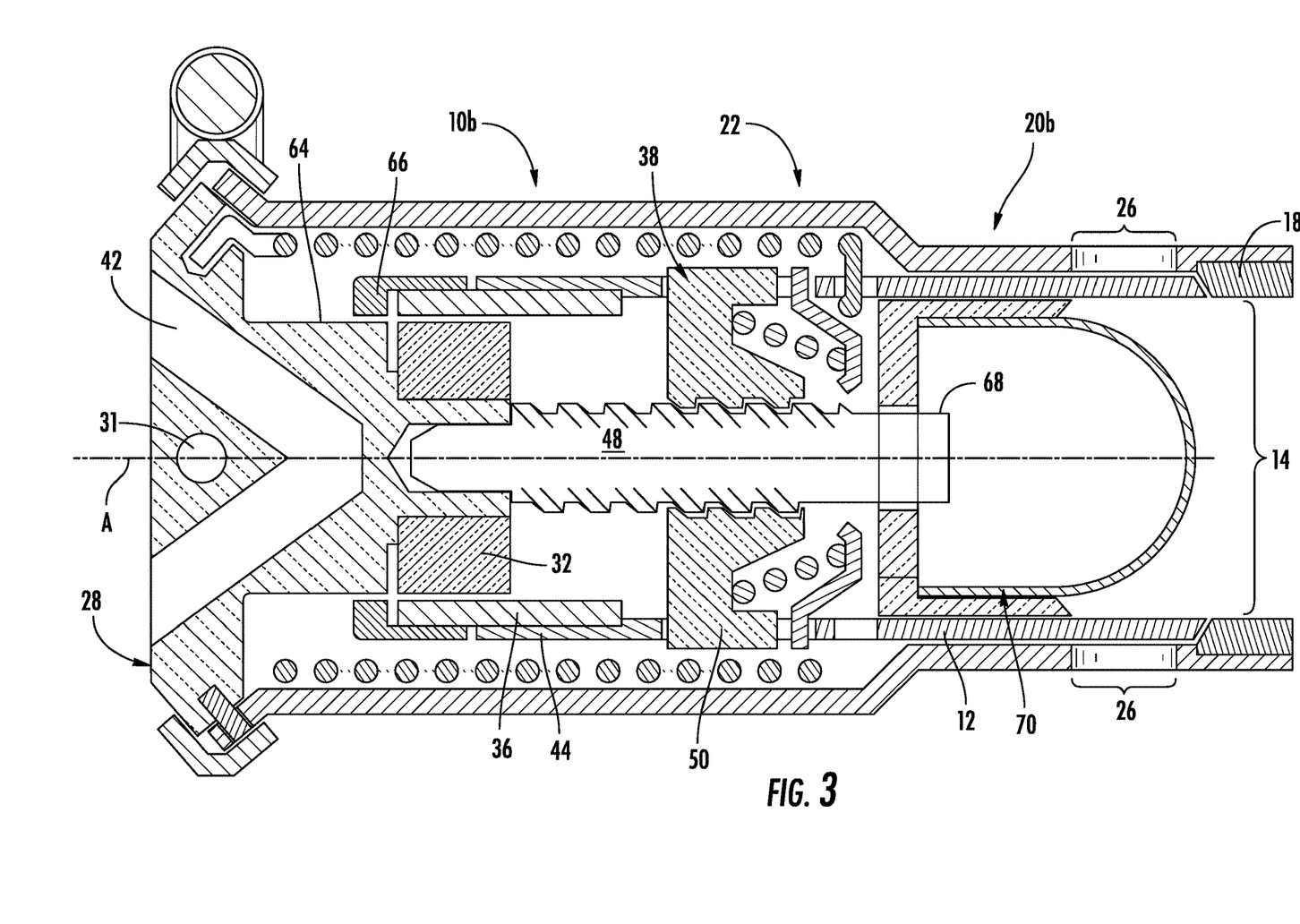
FIG. 3 is a longitudinal sectional view of a third alternative embodiment of an actuator and compact EGR valve according to aspects of the disclosure.
Figure 8:
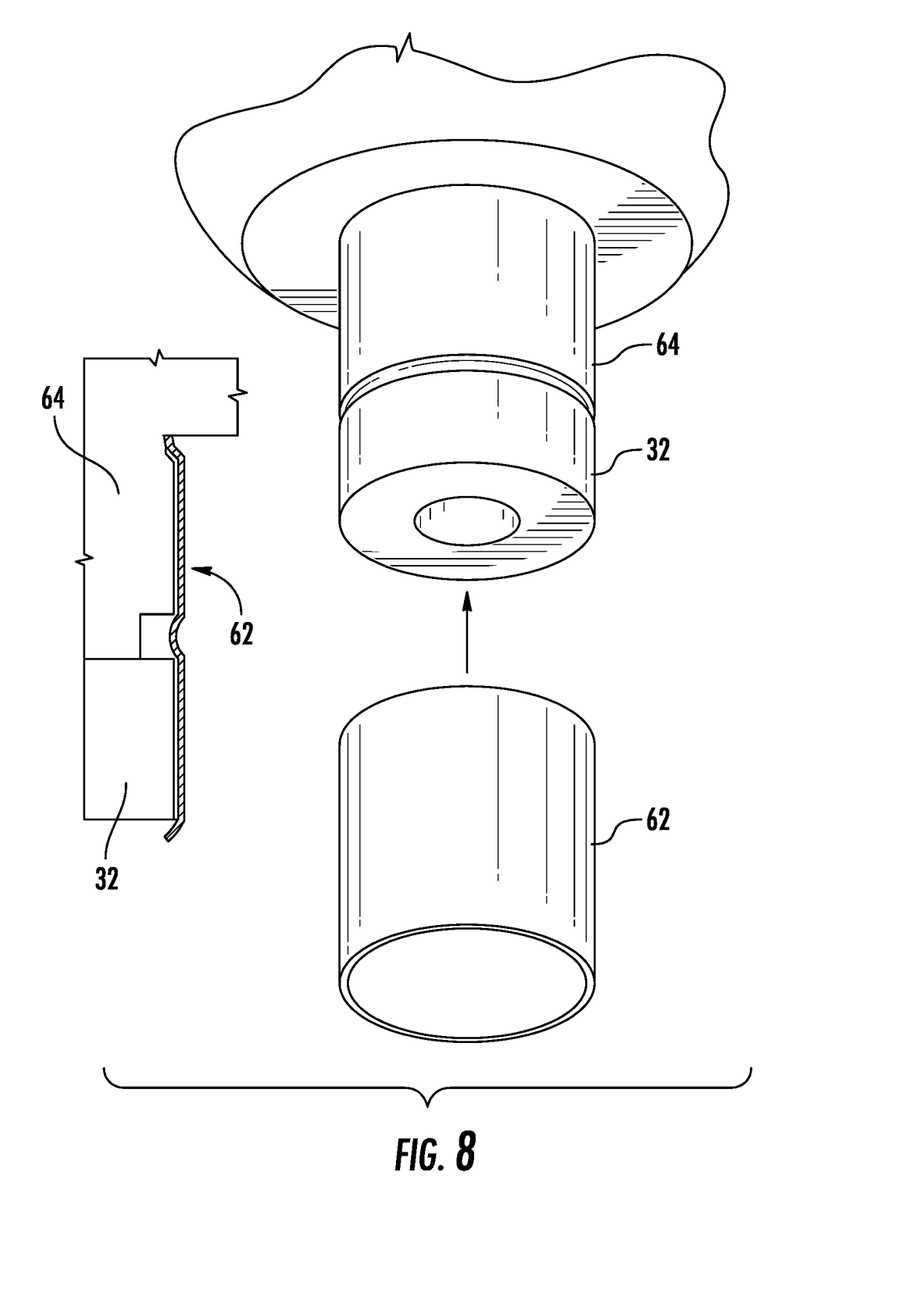
FIG. 8 illustrates a PTFE tube and method of securing the PTFE tube around a stator according to aspects of the disclosure.

When the control circuit 40 applies power to the coils of the stator 32, magnetic attraction between the stator coils and the permanent magnets 36 moves the rotor 38 in a manner that is well-understood by those skilled in the art. In a conventional outrunner brushless motor configuration, the rotor is supported at both axial ends to withstand the magnetic forces between the stator and magnets while maintaining a small air gap between the rotor and magnets. The air gap is preferably as small as possible because the magnetic field of the stator coils degrades exponentially in air. In the actuator configuration of FIG. 1, the rotor 38 is supported by the bushing 46 at a hub 60 of the magnet ring 44 which imposes unbalanced forces on the opposite, unsupported axial end of the magnet ring 44. The axially extended nut 50 positions the ramp or thread 52 axially spaced from the bushing 46 so that side load forces imposed on the unsupported end of the rotor 38 are delivered to the post 48 to maintain an air gap between the stator 32 and magnets 36. As shown in FIG. 8, in some embodiments of an actuator, a thin sleeve 62 of high temperature, low friction material such as polytetrafluoroethylene (PTFE) can be placed around the stator 32 and an adjacent extension 64 of the end cap to act as a back up guide bearing to ensure the magnet ring remains well-centered as the bushing and other components of the actuator wear over time. The end cap 28 includes a cylindrical extension 64 having an outside diameter substantially equal to an outside diameter of the stator 32. The PTFE sleeve 62 extends around the stator 32 and cylindrical extension 64 of the end cap 28, where it is heated and shrunk into place. An alternative embodiment of an actuator 10b and compact EGR valve 20b illustrated in FIG. 3 provides a sliding bushing 66 to support the outer end of the magnet ring 44 on an outside cylindrical surface of the extension 64 end cap 28 as the rotor 38 moves axially between a retracted and an extended position. The bushing 46 of FIGS. 1 and 2 could be used in combination with the bushing 66 of FIG. 3 to support the magnet ring 44 at both ends during axial movement of the rotor 38.

Figure 6:
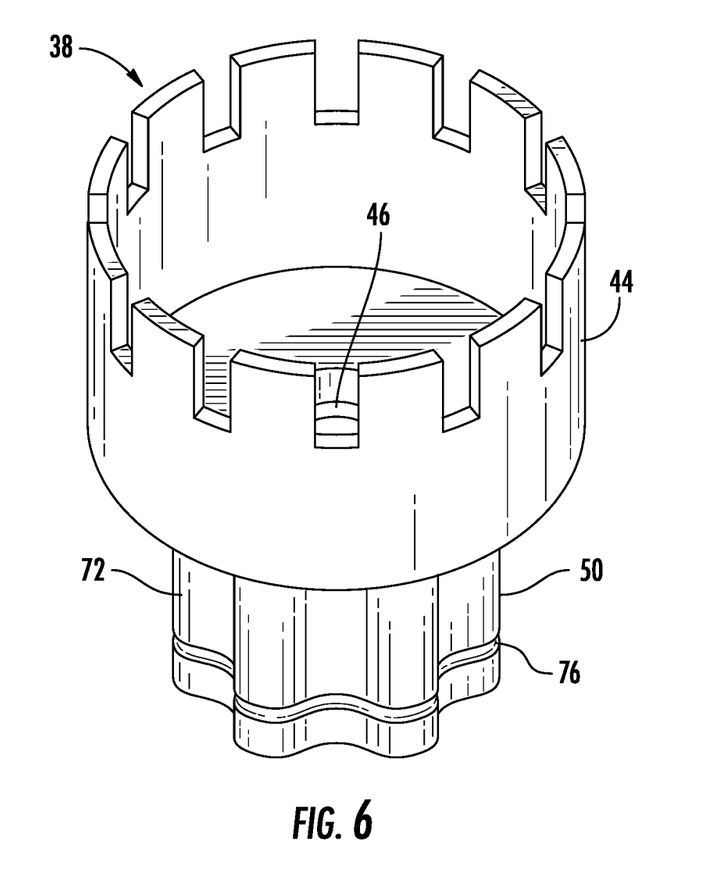
FIGS. 6 and 7 are top and bottom perspective views of a rotor compatible with the actuator and EGR valve of FIGS. 1 and 2.
Figure 7:
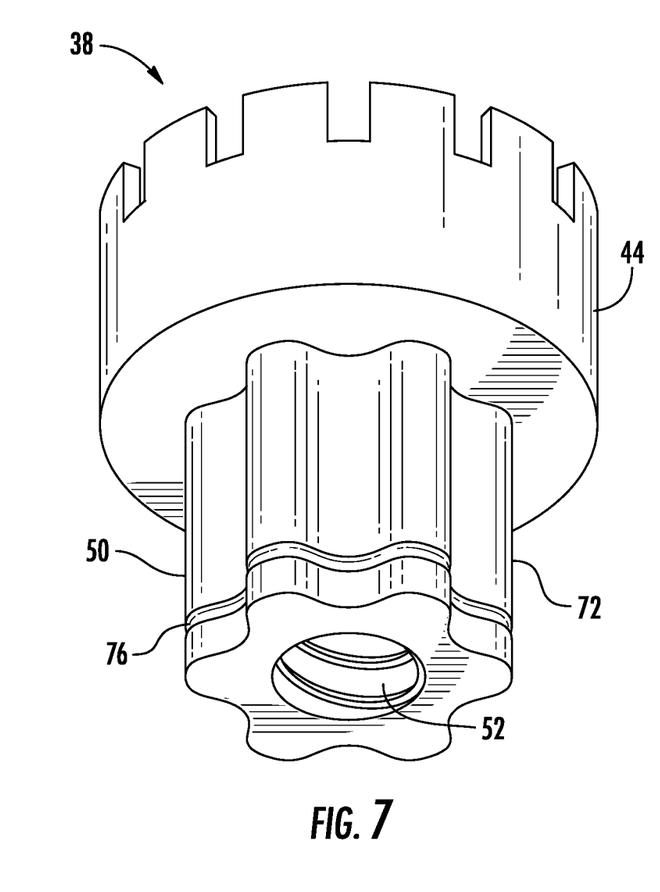

The post 48 is press fit into the end cap 28 and extends along an axis of rotation A of the rotor 38 and valve member 12 to a distal end 68 that supports a pressure balancing piston 70. The portion of the post 48 adjacent the end cap has a smooth, cylindrical outside bearing surface 49 on which the bushing 46 rotates as the rotor 38 moves axially. The surface area and properties of the bearing surface 49 are selected to withstand wear. A threaded portion 54 of the post 48 extends axially away from the end cap 28 after the bearing surface 49. One example of a thread suitable for use in the disclosed actuator is a T-12 thread of the C-class type that is precise, low friction and resistant to jamming. One embodiment of the nut 50 may be manufactured using a powder metal process and impregnated with lubricant that will improve the sliding properties of the thread 52/54 over the life of the actuator 20, 20a. The nut 50 may be combined with the magnet ring 44 in one integral part as shown in FIGS. 6 and 7. Alternatively, the rotor hub 60, magnet ring 44 and nut 50 may be manufactured separately and joined together by methods used to manufacture outrunner drone motors. A rotor 38 assembled from separate parts is illustrated in FIG. 1.

As shown in FIGS. 6 and 7, in some embodiments the outside surface of the nut 50 may define drive teeth 72 or other structure that will engage the cylindrical valve member 12 so that the valve member rotates with the rotor 38. FIGS. 1 and 2 illustrate an annular metal seal 74 that extends radially between the nut 50 and the inside surface of the housing 22. The outside surface of the nut 50 defines a groove 76 for a ring or clip 78 that secures the valve member 12 and metal seal 74 to the rotor 38. In the embodiments of FIGS. 1 and 2 coil spring 80 is compressed between the rotor 38 and the metal seal 74 and valve member 12 to bias the metal seal 74 and valve member 12 against the clip 78 in a fixed axial position. Once assembled to the rotor 38, the metal seal 74 and valve member 12 rotate and move axially with the rotor 38. Other methods of assembling the metal seal 74 and valve member 12 to the rotor 38 will occur to those skilled in the art. In the embodiments of FIGS. 1 and 2 it is intended that the valve member 12 rotate with the rotor 38, but an alternative connection could allow the valve member 12 to remain rotationally stationary but move axially with the rotor 38 while the rotor rotates.

Figure 4:
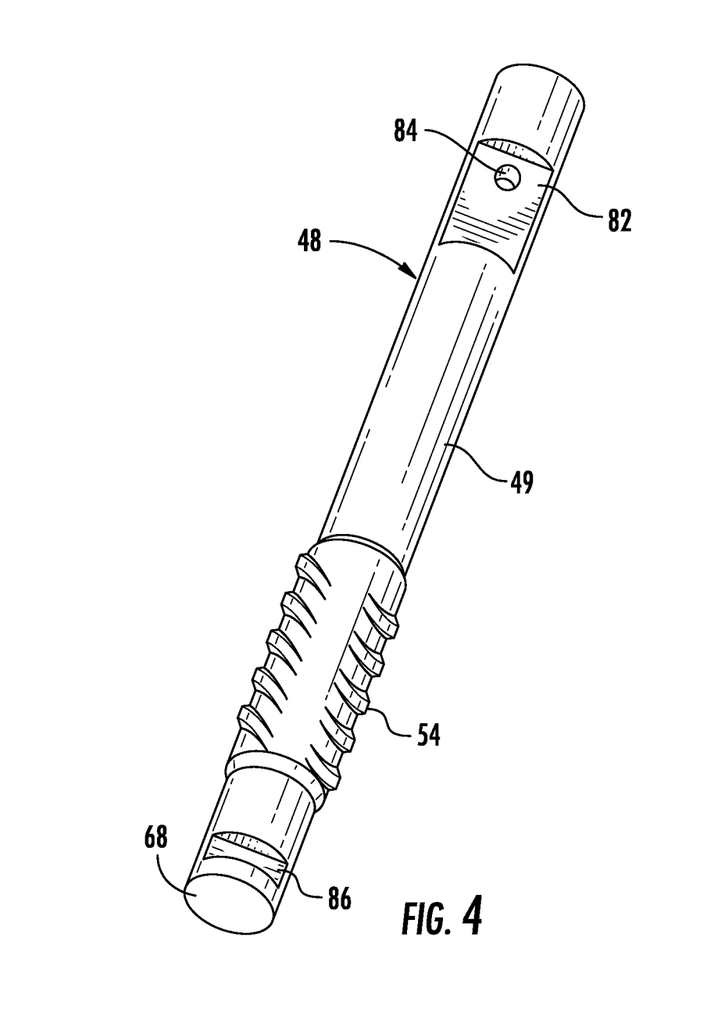
FIG. 4 is a perspective view of a center post compatible with the actuator and compact EGR valve of FIG. 2.
Figure 5:
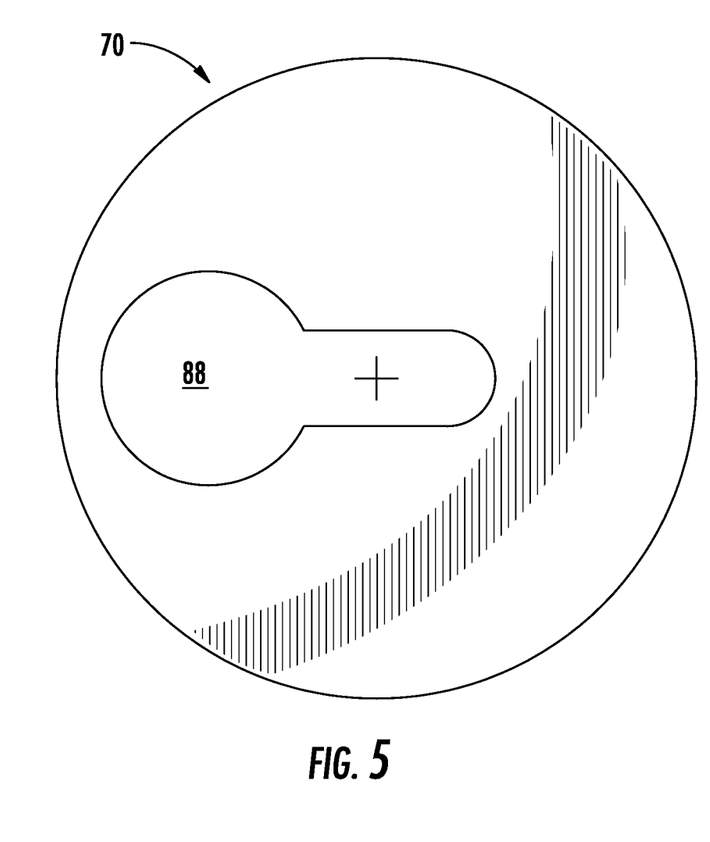
FIG. 5 is a bottom plan view of a pressure balancing piston compatible with the post of FIG. 4 and the actuator and compact EGR valve of FIG. 2.

FIG. 4 illustrates a post 48 used in the actuator embodiment of FIG. 2. As shown in FIG. 2, the post 48 extends through the end cap 28 and includes flats 82 connected by a through bore 84 to force flow reversal and turbulent flow of coolant to extract more heat from the end cap 28 and surrounding components. Two bores 42 in the end cap 28 communicate with a space defined by the flats 82 and through bore 84 of the post 48. The distal end 68 of the post 48 is connected to a pressure balancing piston 70 in a manner that allows the piston 70 to "self-center" within the cylindrical valve member 12. FIG. 4 illustrates slots 86 machined on the post 48 that mate with a keyhole opening 88 in the pressure balancing piston 70. During assembly, the distal end 68 of the post 48 is inserted through the large opening in the keyhole 88. Further assembly places the cylindrical valve member 12 around the pressure balancing piston 70 so the piston 70 cannot become detached from the post 48. Allowing the pressure balancing piston 70 to find its own center allows a tight fit between the outside diameter of the pressure balancing piston 70 and the inside diameter of the cylindrical valve member 12, which lowers the rate at which exhaust gasses can leak into the actuator 10, 10a. The pressure balancing piston 70 may include a hemispherical cap 90 that contains heat resistant insulation 92 such as mineral wool. As shown in FIGS. 1 and 2, the outside diameter of the pressure balancing piston 70 may include a thin wall cylindrical portion 94 facing the inside diameter of the valve member 12. One or both of the facing surfaces of the valve member 12 and cylindrical portion 94 may be textured to create turbulent flow to reduce leakage into the actuator 10, 10a. The thin wall cylindrical portion 94 of the pressure balancing piston 70 may be configured to dilate in a radial direction when exposed to gas pressure, reducing the annular space between the pressure balancing piston 70 and the cylindrical valve member 12 through which gas can leak into the actuator housing 22.

The metal seal 74 is configured so that an annular radial edge 75 of the metal seal 74 contacts the inside diameter of the housing 22 when the rotor 38 and valve member 12 are in the extended, closed position illustrated in FIGS. 1 and 2. It is anticipated that the disclosed EGR valve 20, 20a will be exposed to the highest gas pressure when the valve member 12 is closed. When the valve member 12 is in the closed position, exhaust gas will try to flow between the outside diameter of the pressure balancing piston 70 and the inside diameter of the valve member 12. As previously discussed, the facing surfaces of the pressure balancing piston 70 and valve member 12 may be structured to minimize the flow of gas between them, and a tuned cylindrical member 94 on the pressure balancing piston 70 is configured to dilate and narrow the passage between the outside diameter of the pressure balancing piston 70 and the inside diameter of the valve member 12 when exposed to pressure. The disclosed metal seal 74 is arranged so that as gas flowing between the pressure balancing piston 70 and the cylindrical valve member 12 raises the pressure inside the housing 22, the metal seal 74 is biased against the inside surface of the housing 22 to slow gas flow through the housing 22. Using gas pressure energized seals on the pressure balancing piston 70 and inside the housing 22 provides sealing when differential pressure is high and very low friction when differential pressure is low. This property of gas pressure energized seals improves over sliding seals like piston rings which impose friction regardless of differential pressure.

The actuator of FIG. 2 includes a torsion return spring 96 constructed of flattened wire to rotationally bias the rotor 38 and valve member 12 toward the extended, closed position shown in FIGS. 1 and 2. The return spring 96 is situated in an annular space between the rotor 38 and the inside of the housing 22, where a relatively large volume accommodates a spring of sufficient length that it can efficiently store the energy needed to close the EGR valve 20, 20a while having a relatively constant spring rate. In the embodiments of FIGS. 1 and 2, two full turns of the rotor will move the valve member 12 approximately 15 mm from the closed position to a fully open position. The thread 54/52 on the post 48 and nut 50 can be selected to provide different amounts of axial movement for each turn of the rotor. The control circuit 40 can be configured to function similar to that of a stepper motor, by energizing each group of coils in the stator 32 in sequence, the rotor 38 will rotate. By maintaining one group of coils energized, the rotor 38 can be held in a position to maintain a desired rate of gas flow through the EGR valve 20, 20a. In the disclosed EGR valves 20, 20a, the return spring 96 closes the valve 20, 20a if the drive circuit 40 fails.

Figure 9:
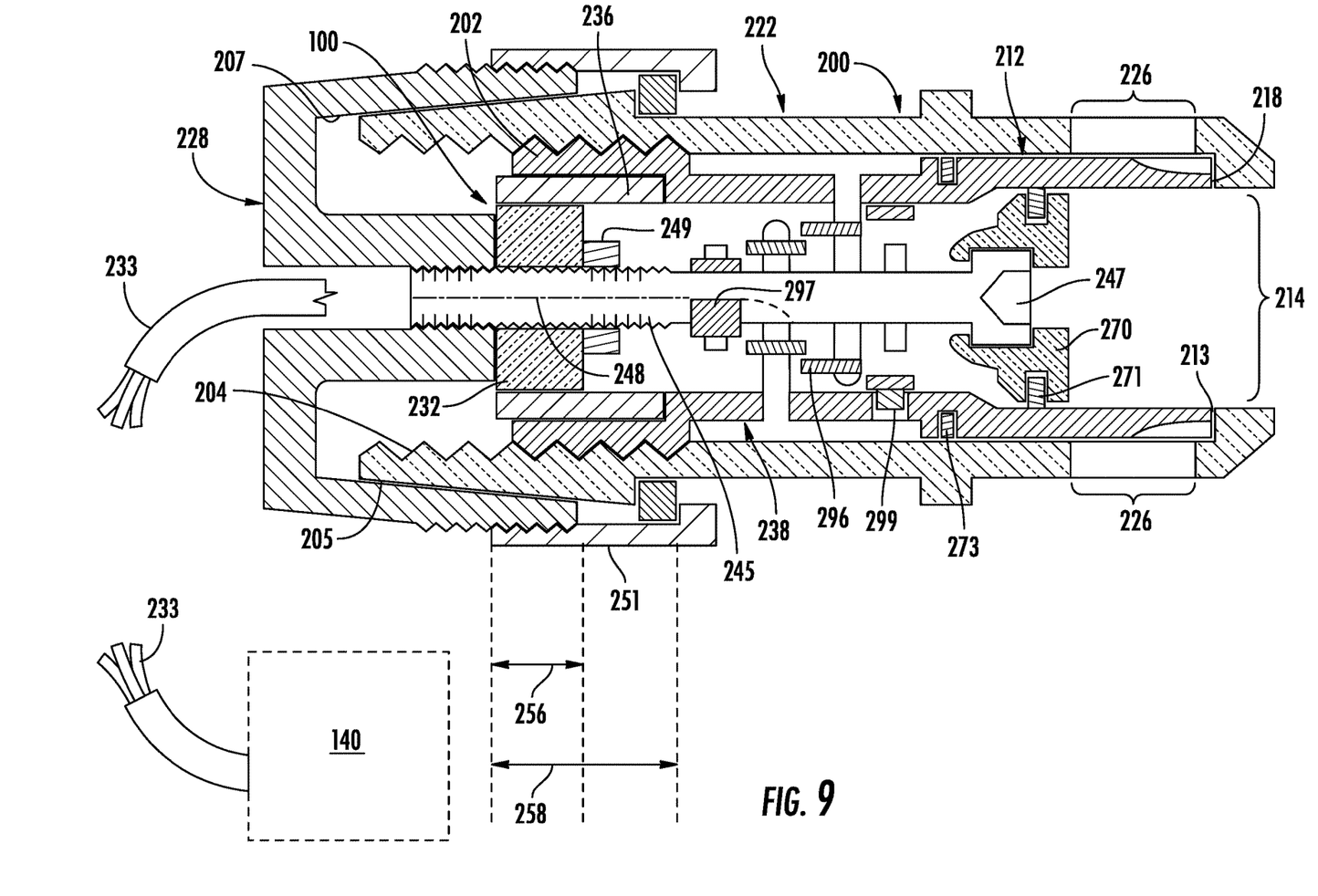
FIG. 9 is a longitudinal sectional view through an alternative embodiment of an actuator and compact EGR valve according to aspects of the disclosure.

FIGS. 9-13 illustrate alternative embodiments of an actuator 100 and compact EGR valve 200. In the embodiment of FIGS. 9-13, the rotor 238 and valve member 212 are combined into a single component 215 illustrated in FIGS. 10 and 11. Movement of the combined rotor/valve member 215 is guided by a ramp or thread 202 on a circumferential outside surface of the rotor and a complementary ramp or thread 204 on an inside surface of the housing 222. A cylindrical outside surface 216 of the valve member 212 also guides rotation of the combined rotor/valve member 215 within the housing 222. FIG. 9 is a sectional view through an actuator 100 and EGR valve 200 showing a brushless motor-driven actuator 100 that operates on the same basic principles as the actuator 10, 10a of the embodiments of FIGS. 1 and 2 described above. The basic structure, function and methods of controlling the actuator 100 are the same as that described for the embodiments of FIGS. 1 and 2. The actuator and EGR valve of FIGS. 9-13 differs from the embodiments of FIGS. 1 and 2 with respect to how movement of the rotor 238 and valve member 212 are guided within the housing 222, how the valve member 212 is coupled to the rotor 238, and the structures used to prevent exhaust gasses from leaking into the housing 222.

The rotating components of the actuator and compact EGR valve of FIGS. 9-13 are spring biased toward the closed position shown in FIG. 9 and can be opened to generate a metered flow of exhaust gas from an opening 214 continuously exposed to exhaust gasses through metering passages 226 defined in the housing 222 and exposed by axial movement of the cylindrical valve member 212 away from an annular valve seat 218. A control circuit 140 applies electrical power to the coils of the stator 232 in a pattern that rotates the rotor 238 and coupled valve member 212 to retract the valve member 212, allowing gas flow into opening 214 and through metering passages 226 defined in the side wall of the housing 222. In the closed position the cylindrical valve member 212 is seated against a valve seat 218 at the end of the housing 222 and covers the metering passages 226, preventing gas flow through the EGR valve 200. The number and shape of the metering passages 226 can be selected to define a desired flow capacity and metering pattern. The actuator 100 of FIGS. 9-13 includes a coiled return spring 296 that is "wound" during assembly to bias the rotating component (combined rotor/valve member 215) toward the closed position of FIG. 9.

In the actuator 100 and EGR valve 200 of FIGS. 9-13, the rotor 238 and valve member 212 are intended to "self-guide" during rotational and axial movement within the housing 222, which may reduce or eliminate the need for roller bearings or bushings. The torque generated by the actuator 100 must be sufficient to overcome friction between the moving parts, the bias of the return spring 296, and the effect of any deposits that may form on the valve member 212, housing 222, or valve seat 218 at the "hot" end of the EGR valve 200. A female ramp or thread 204 formed on the inside surface of the housing 222 engages a complementary ramp or thread 202 on the outside of the rotor 238 to translate rotation into axial movement. In this embodiment of the actuator 100, the rotating component 215 is supported and guided at an outside surface of the rotor 238 and valve member 212 and does not employ bushings or bearings, although bearings or bushings could be added to reduce the power needed to rotate the rotor and valve member. This structure requires that the complementary threads 202/204 and facing surfaces of the housing 222 and rotating valve member 212 be very accurate and concentric with the stator 232 supported by the end cap 228. When machining the threads 204 on the inside of the housing, the tapered exterior surface 205 may be formed first and used as a reference to ensure the thread 204 supports the rotor 238 at a precise, centered location relative to the tapered surface 205. The end cap 228 includes a tapered reference surface 207 that is used to center the stator 232. During assembly, the tapered surfaces 207, 205 of the servo cap 228 and housing 222 mate to locate the stator 228 within the housing 222 and define the annular space between the stator 228 and housing thread 204 within which the rotor 238 rotates.

According to aspects of the disclosure, the stator 232 is secured to the end cap 228 by a center post 248, which may be a threaded bolt such as an M8 cap screw. A spring clip or nut 249 on the post 248 holds the stator 232 in a fixed axial position when the end cap 228 is mounted to the housing 222 by a retaining ring 251. Wires 233 connecting the stator 232 to a control circuit 140 extend through the end cap 228. Electrical connections to the stator 232 may include conductors 233 to provide electrical power to the stator coils and to send feedback to the control circuit 140 regarding the rotational position of the rotor 238 and current flow through the stator coils. The center post 248 also supports a pressure balance piston 270 and sealing ring 271. The sealing ring 271 on the pressure balance piston 270 forms a seal against the cylindrical inside surface of the cylindrical valve member 212. The sealing ring 271 may be of the type used on pistons of internal combustion engines. The split piston ring 271 is compressed radially during installation and rebound to find a self-located centered position spanning the gap between the outside diameter of the pressure balance piston 270 and the inside diameter of the valve member 212. A similar ring 273 is arranged to seal between the outside diameter of the valve member 212 and the inside diameter of the housing 222. The pressure balance piston 270 is exposed to exhaust gas pressure and reduces load on the cylindrical valve member 212. A slot 245 in the side of the center post 248 accepts a tang 297 of the return spring 296 and allows the tang 297 to move along the slot 249. The head 247 of the center post 248 is inserted into a socket on the pressure balance piston 270 and the piston 270 may be secured to the center post 248 by crimping a lip surrounding the socket around the head 247 of the center post 248. The head 247 of the center post 248 and complementary socket may be configured with some radial play to allow the pressure balance piston 270 to find its own center within the cylindrical valve member 212.

Figure 10:
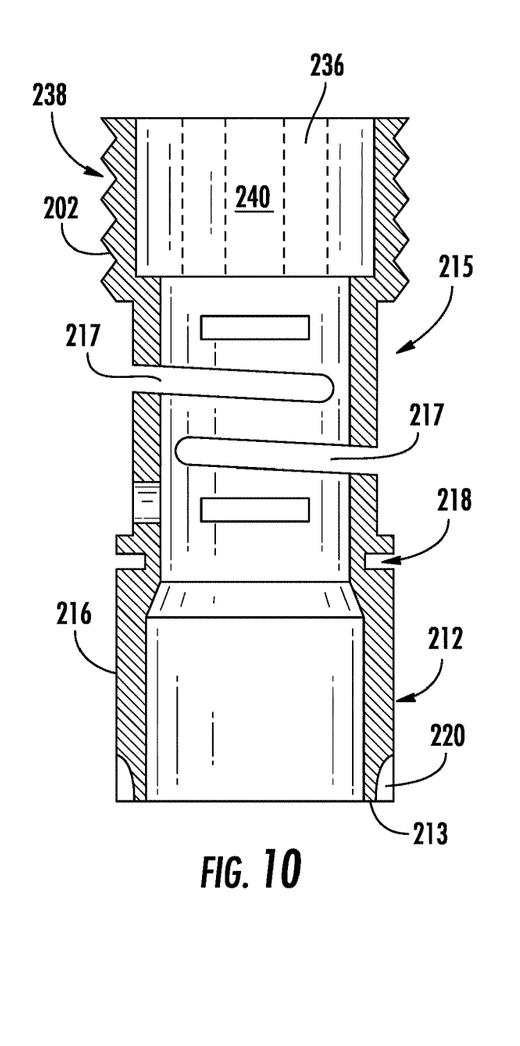
FIG. 10 is a longitudinal sectional view through a combined rotor/valve member compatible with the actuator and EGR valve of FIG. 9.
Figure 11:
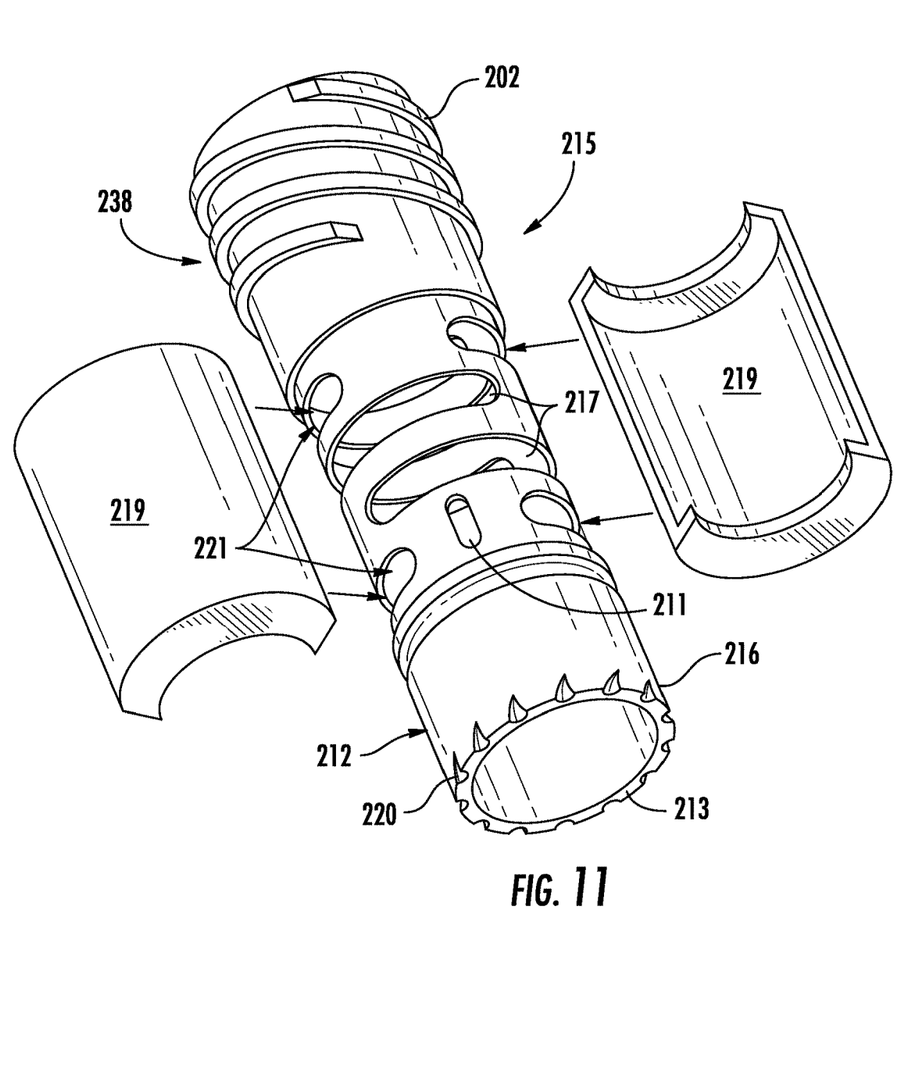
FIG. 11 is a perspective view of the combined rotor/valve member of FIG. 10, showing optional clips for adjusting spring pre-load according to aspects of the disclosure.

In the compact EGR valve of FIGS. 9-13, the rotor 238 and cylindrical valve member 212 are combined into a single component 215. FIGS. 10 and 11 illustrate one embodiment of a combined rotor and valve member 215. The combined rotor/valve member 215 may be formed as a single component from a thick-walled stainless-steel tube, but other forms of manufacture may be used. The upper end of the combined rotor/valve 215 defines a cylindrical area 240 to receive and support the axially extended magnets 236 of the brushless motor-driven actuator 100. The magnets 236 may be individual permanent magnets secured to the inside surface of the cylindrical area 240 by adhesive. Alternatively, the magnets 236 may be formed on a rubberized magnetic sheet, rolled into a cylinder and inserted into the rotor 238. The rotor magnets 236 must have an axially extended configuration so that the magnets 236 always overlap with the full axial length 256 of the stator 232 regardless of the axial position of the rotor 238 within the housing 222. As illustrated in FIG. 9, the axial length 258 of the rotor magnets 236 is selected so that when the actuator 100 is at its fully extended or retracted position, the full axial length 256 of the stator 232 is spanned by a portion of the magnets 236.

The outside surface of the rotor 238 includes the outward facing thread 202 that mates with the inward facing thread 204 defined on the inside of the housing 222. As shown in FIGS. 10 and 11, in a longitudinal direction, the middle of the rotor/valve component 215 has a reduced outside diameter and includes one or more helically oriented spring slots 217 which form a spring between the rotor 238 and the cylindrical valve member 212. This spring is intended to cushion the impact of the end face 213 of the cylindrical valve member 212 with the annular valve seat 218 to prevent jamming of the valve member 212 in the closed position. The pre-load of this spring can be adjusted using simple stamped steel clips 219 secured in clip slots 221 defined above and below the spring slots 217. The reduced diameter of the rotor/valve component 215 at the center of the component reduces its contact area with the inside of the housing 222 and provides space for the pre-load clips 219, if needed. The rotor/valve component 215 also defines a slot 211 for one end of the return spring 296. The return spring 296 is engaged between the center post 248 and the rotor/valve component 215 to return the rotor 238 and cylindrical valve member 212 to the closed position shown in FIG. 9. One embodiment of a return spring 296 is a coiled ribbon spring with tangs 297, 299 engaged with the center post 248 and rotor/valve component 215, respectively. This type of spring may be referred to as a "clock" spring. The return spring 296 is pre-loaded during assembly of the EGR valve by rotating the end cap 228 and center post 248 (engaged with one end of the return spring 296) while keeping the rotor/valve component 215 in a fixed position relative to the housing 222. When the desired spring pre-load is achieved, the tapered surface 207 inside the end cap 228 is mated with the tapered surface 205 of the housing 222 and secured with the retaining collar 251 in a fixed rotational and axial position. The spring pre-load is selected to have sufficient energy to counter-rotate the rotor/valve component 215 from an open position to the closed position shown in FIG. 9.

The outside surface 216 of the cylindrical valve member 212 is smooth and cylindrical and defines a groove 218 for a sealing ring 273. The sealing ring 273 prevents exhaust gas from leaking between the cylindrical valve member 212 and the inside surface of the housing 222. The lower edge of the cylindrical valve member 212 may be provided with teeth or serrations 220 of any configuration. The serrations or teeth 220 do not extend radially through the valve member 212, leaving a continuous, annular sealing surface 213 at the forward end of the valve member 212 that will mate with the annular valve seat 218. As the cylindrical valve member 212 rotates within the housing 222, the teeth or serrations 220 cut away carbon deposits that may accumulate on the inside surface of the housing 222 and valve seat 218. An inside surface of the cylindrical valve member 212 mates with the sealing ring 273 supported by the pressure balance piston 270 to prevent exhaust gas from leaking between the pressure balance piston 270 and the valve member 212.

Figure 12:
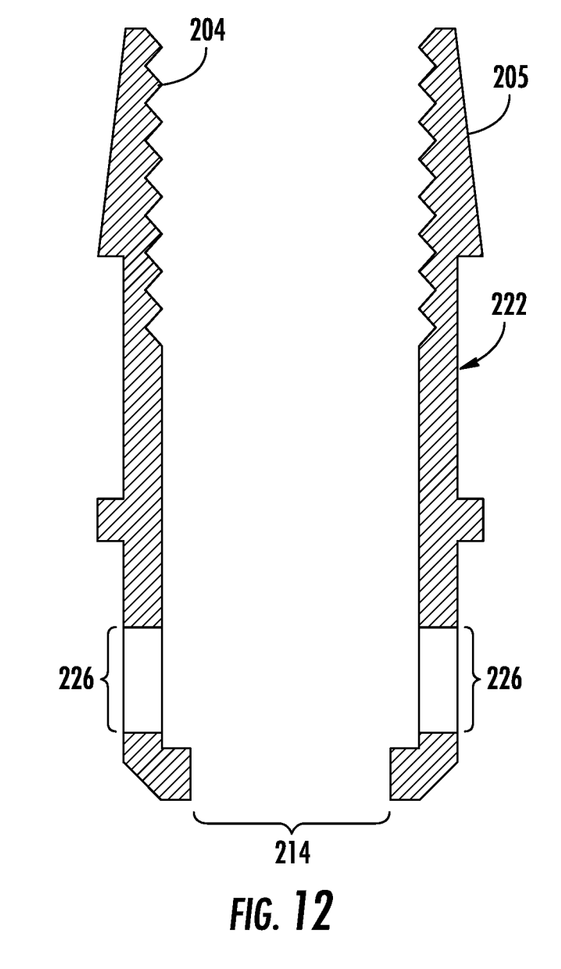
FIG. 12 is a longitudinal sectional view of a housing compatible with the actuator and EGR valve of FIG. 9.
Figure 13:
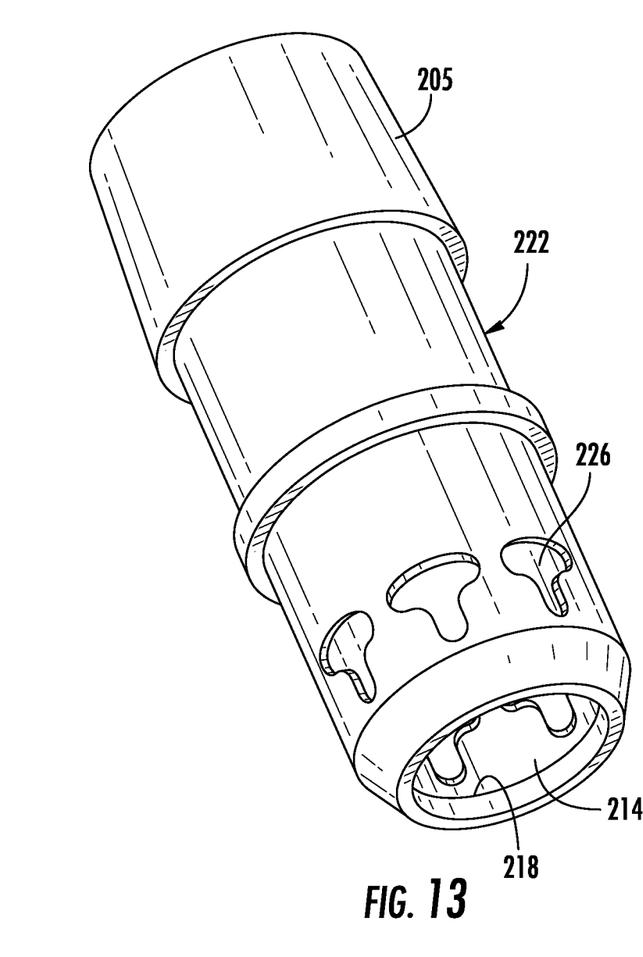
FIG. 13 is a perspective view of the housing of FIG. 12.

FIGS. 12 and 13 illustrate one example of a housing 222 for use with a version of the actuator 100 and EGR valve 200 shown in FIG. 9 where the rotating components are guided at their outside surfaces. FIG. 13 illustrates an arrangement of metering passages 226 arranged above the valve seat 218 at the "hot" end of the housing 222. The number, shape and position of the metering passages 226 can be designed to interact with the cylindrical valve portion 212 of the rotor/valve component 215 to provide a desired exhaust gas metering function for each axial position of the rotor/valve member 215. Flow through embodiments of the compact EGR valve 200 is defined by the size and shape of the metering passages 226 through the body, and the rate at which the cylindrical valve member 212 moves to open the metering passages 226. The pitch of the thread 202/204 on the rotor 238 and inside the housing 222 may be selected to provide relatively slow axial movement of the cylindrical valve member 212 (low pitch) with relatively high force advantage or relatively fast axial movement of the cylindrical valve member 212 (high pitch) with relatively low force advantage. The pitch of the threads 202/204 can be used as one factor in the regulation of flow through the disclosed EGR valve 200. The number and shape of the metering passages 226 can also be altered to achieve a desired flow of exhaust gas at different axial positions of the cylindrical valve member 212. One disclosed shape for the metering passages 226 is a keyhole shape which is narrow at the bottom and wider at the top. This shape would provide gas flow that starts slow and gets larger when the larger part of the passage is exposed. In the housing 222 of FIG. 13, all the openings 226 are of the same shape and have the same axial location, but this is not required. Openings of different shapes at different axial locations can be used to tailor the regulation of flow through the EGR valve 200. Those skilled in the art will recognize that the flow pattern can be configured using different aspects of the actuator 100 and valve 200 to achieve a wide range of flow capacity and rate of change.

In a brushless motor, the gap between the stator coils and the magnets is critical to efficient operation of the motor. The preferred gap between stator coils and magnets is as small as possible. Reducing the gap between the servo rotor magnets and the stator coils in the actuator 100 of FIGS. 9-13 requires that the rotor 238 and housing 222 have accurate surfaces to locate and guide the rotor 238 and to support and locate the stator 232. When manufacturing the rotor 238, the inside surface 240 which supports the magnets 236 may be used as a reference for the machining of the outside surface and male thread 202 to ensure that these are concentric relative to the inside surface 240. When manufacturing the housing 222, the tapered outside surface 205 is formed first and then used as a reference when forming the female thread 204 on the inside of the housing 222. The end cap 228, which may be a die cast aluminum part, the tapered inside surface 207 is machined to ensure this surface is concentric with the axis of the center post 248 and outside surface of the stator 232. The end cap tapered surface 207 is complementary to the tapered surface 205 on the outside of the housing 222 which is also machined to be concentric with the female threads 204 on the inside of the housing 222. The mated tapered surfaces 207, 205 of the end cap 228 and housing 222 determine the location of stator 232 within the housing 222 and define the annular space within which the rotor/valve component rotates and reciprocates axially.

What is claimed:

1. A valve comprising:
   a housing having a first end, and a second end defining a cylindrical valve chamber, a radial first opening in communication with said valve chamber and at least one second opening in communication with said valve chamber;
   an actuator comprising:
      a stator supported within said housing at a fixed axial and rotational position, said stator including a plurality of stator coils;
      a rotor including a plurality of magnets arranged to rotate relative to said stator; and
      a motor control circuit arranged to apply electrical power to said plurality of stator coils in a pattern that generates a magnetic field that exerts torque on the plurality of magnets in the rotor, wherein said torque rotates the rotor within said housing in a first direction;
   a rotationally symmetrical valve member coupled to rotate with the rotor;
   a first ramp or thread that rotates with the rotor and is coupled to the valve member;
   a second ramp or thread engaged with said first ramp or thread and fixed relative to said housing; and
   a return spring coupled to said rotor to rotate said rotor in a second direction when power is not applied to the stator coils,
   wherein rotation of said rotor in said first direction causes said valve member to rotate and move axially within said valve chamber in a first axial direction from a closed position preventing fluid communication between said first opening and said second opening toward an open position allowing fluid communication between said first opening and said second opening, rotation of said rotor in said second direction causing rotation and axial movement of said valve member in a second direction from the open position toward said closed position.

2. A valve of claim 1, wherein said at least one second opening is an axial opening.

3. The valve of claim 1, wherein said motor control circuit is configured to apply power to said stator in a pattern to rotate said rotor a predetermined number of rotations in said first direction to axially move said valve member in said first direction from the closed position covering said first opening to the open position.

4. The valve of claim 1, wherein said motor control circuit is configured to apply power to said stator to rotate said rotor to an intermediate axial position between the open position of said valve member and the closed position of said valve member and hold said rotor in said intermediate axial position.

5. The valve of claim 1, wherein said valve housing includes an annular valve seat along the rotational axis past the first opening.

6. The valve member of claim 5, wherein said annular valve seat is configured to accept contact from an annular forward end of said valve member, said annular forward end provided with serrations or teeth that do not interrupt a sealing portion of said annular forward end that mates with said annular valve seat.

7. The valve of claim 1, wherein said valve member defines an interior space facing said second opening, said valve comprising a pressure balance piston in said interior space and continuously exposed to said second opening, a cylindrical side wall of said valve member arranged radially between said valve housing and said pressure balance piston.

* * * * *